United States Patent
Yates et al.

[11] Patent Number: 5,866,002
[45] Date of Patent: Feb. 2, 1999

[54] APPARATUS FOR ACTIVATION OF A DIGESTING AGENT AND METHOD OF ITS USE

[75] Inventors: Ivan William Yates, Castleview House, County Carlow; Dermot Joseph McElroy, County Wicklow, both of Ireland

[73] Assignee: Ivan William Yates, Ireland

[21] Appl. No.: 739,630

[22] Filed: Oct. 30, 1996

Related U.S. Application Data

[63] Continuation of Ser. No. 307,720, Dec. 15, 1994, Pat. No. 5,683,575.

[30] Foreign Application Priority Data

Mar. 24, 1992 [IE] Ireland ...................................... 920934

[51] Int. Cl.⁶ ............................... C02F 3/00; C12M 1/36; C12M 1/38
[52] U.S. Cl. .......................... 210/601; 210/139; 210/141; 210/149; 210/198.1; 210/632; 435/262; 435/286.1
[58] Field of Search ..................................... 210/138, 139, 210/149, 173, 175, 198.1, 205, 206, 608, 612, 613, 614, 632, 742, 774, 610, 141, 601; 366/156.1, 156.2; 435/262, 289.1, 267, 283.1, 286.1

[56] References Cited

U.S. PATENT DOCUMENTS

| | | | |
|---|---|---|---|
| 3,506,582 | 4/1970 | Gertzman | 210/632 |
| 3,635,797 | 1/1972 | Battisoni et al. | 210/632 |
| 4,666,606 | 5/1987 | Heinicke | 210/632 |
| 4,670,149 | 6/1987 | Francis | 210/608 |
| 4,797,208 | 1/1989 | Miller et al. | 210/632 |
| 4,882,059 | 11/1989 | Wong et al. | 210/632 |
| 4,940,539 | 7/1990 | Weber | 210/149 |
| 5,091,095 | 2/1992 | Fries et al. | 210/742 |
| 5,171,687 | 12/1992 | Moller et al. | 210/610 |
| 5,174,651 | 12/1992 | Gaddis | 366/156.1 |
| 5,284,587 | 2/1994 | Wong et al. | 210/610 |

*Primary Examiner*—Joseph W. Drodge
*Attorney, Agent, or Firm*—Niro, Scavone, Haller & Niro

[57] ABSTRACT

This invention provides an apparatus for activation of a digesting agent for an organic material, the apparatus including a tank, a device for activating the digesting agent in the tank, and a device for enabling the activated digesting agent to contact the organic material. The activating device is preferably a heating element. The enabling device is preferably an exit pipe. The invention has particular application in the preventative maintenance of a grease trap drainage system.

8 Claims, 3 Drawing Sheets

APPARATUS FOR ACTIVATION OF A DIGESTING AGENT AND METHOD OF ITS USE

This application is a continuation of U.S. patent application 08/307,720, filed on Dec, 5, 1994, now U.S. Pat. No. 5,683,575.

BACKGROUND OF THE INVENTION

1. Technical Field

The present invention relates to an apparatus for activation of a digesting agent. The invention has application for the complete or partial bio-degradation of an organic material.

The term "organic material" as used herein is intended to embrace excrement from humans and other animals, and waste from kitchens (for example, kitchens of restaurants, hotels, public houses, hospitals and schools); bathrooms; meat and poultry processing plants; slaughterhouses; and plants from the pulping, food processing, wool scouring, rendering, tanning and fermentation industries and the like.

The invention has particular application in the preventative maintenance of a drainage system, so as to inhibit the formation of grease/sludge blockages therein.

A drainage system typically comprises a downpipe communicating with a U-shaped trap which in turn communicates with a substantially horizontal pipe leading into a grease trap downstream of which is either a septic tank or a main waste outlet.

2. Background Art

Grease, oils and fats are used extensively in food preparation and cooking. Whilst warm, they are free-flowing but as they cool down, they start to solidify causing obstruction or blockage of drainage systems.

It is known to incorporate a grease trap in a drainage system to separate grease from the waste watersby making use of the ability of grease globules to float on water. Such a grease trap has a deflector disposed adjacent a waste inlet and a baffle disposed adjacent a waste outlet. The deflector and the baffle partially define a central chamber. Such a grease trap reduces the speed of incoming waste water using the deflector and the grease globules then rise into the central chamber of the grease trap to form a grease layer in the central chamber. The water underneath the grease layer is forced out of the grease trap under the baffle by the incoming waste water. The grease trap is provided with an opening to permit removal of the grease layer trapped in the central chamber at regular intervals.

Digesting agents may be used wherever organic material is present, including bathroom maintenance; odor control and surface cleaning; laundry pre-spotting; garbage disposal; trap and drain maintenance, carpet and fabric care; waste water systems; porta-toilets and roller vehicle (mobile homes, caravans, campers and the like) applications; and cattle, pig and animal shelters and feed lots.

Specifically, various digesting agents have been developed to digest grease and sludge (protein, starch and/or fat deposits) into an aqueous solution or suspension, which can be washed away with the waste water. Such digesting agents may include aerobic and/or anaerobic bacteria and, optionally, enzymes. Suitable enzymes, when present, include porteases, amylases, lipases and/or cellulases. The bacteria and/or enzyme(s) of the digesting agent are chosen, having regard to the nature of the organic material for bio-degradation.

One such digesting agent is distributed in Ireland under the Trademark "Super Chemzyme III" by National Chemsearch (Ireland) Limited of Unit B, Airport Industrial Estate, Santry, Dublin 9, Ireland. "Super Chemzyme III" is manufactured by NCH of Mohawk Laboratories, Ripley, Derbyshire, United Kingdom. "Super Chemzyme III" contains compatible non-competing types of bacteria in a viscous, relatively stable suspension/emulsion. "Super Chemzyme III" comprises a cocktail of aerobic and anaerobic bacteria sourced from citrus fruit. The bacteria produce specific enzymes to attack carbohydrate, protein and fats. "Super Chemzyme III" also comprises a surfactant or grease emulsifier—BE 32—to break up oily deposits into smaller suspended particles, thereby increasing the surface area in contact with the enzymes produced by the bacteria.

Another such digesting agent is distributed in Ireland under the Trademark "BIO-CAT WD10" by T. C. BIO LIMITED of Unit 5, Newtown Industrial Estate, Newtownmountkennedy, County Wicklow, Ireland. "BIO-CAT WD10" is manufactured by Hallmark Industries Incorporated of 564 Kings Highway, West Springfield, Mass. 01089, Unites Stated of America and is distributed throughout the United States of America by Bio-Catalytic Enterprises Incorporated of 495 Post Road East, Westport, Conn. 06880, United States of America. "BIO-CAT WD10" is a concentrated suspension of bacterial spores consisting of multiple species of selected Bacillus micro-organisms and stabilized enzyme systems. "BIO-CAT WD10" also incorporates bio-degradable surfactants.

It is known that efficiency is optimized by introducing the digesting agent into the horizontal pipe of the drainage system during a period when the water flow rate therethrough is at its lowest and when the temperature of the waste water is less than 60° C., for example, at night-time. It is also known that the digesting agent typically needs to remain in the grease trap for a period of 4–5 hours, so as to act on the grease layer trapped in the central chamber of the grease trap. This preventative procedure relies on an operator remembering to manually introduce the digesting agent at an appropriate time following which the drainage system is expected to be quiescent and the waste water in the drainage system is expected to be at a temperature of less than 60° C. Furthermore, following the introduction of the digesting agent, a period of time (typically 20–120 minutes) elapses before the digesting agent becomes fully active.

To overcome lapses of human memory, a battery operated peristaltic pump with an integrated programmable timer was developed to introduce the appropriate charge of digesting agent into the horizontal pipe of the drainage system at a pre-selected time.

The disadvantage of the known peristaltic pump and, indeed, of the manual procedure is that the time period when the drainage system is quiescent and when the waste water therein is at a temperature of less than 60° C. may not be sufficiently long to permit complete bio-degradation of the grease/sludge by the digesting agent.

It is also known to recycle an aliquot of activated sludge in an apparatus for bio-degrading an organic material with a digesting agent. However, such activated sludge may contain undesired active micro-organisms and enzymes, which are contemporaneously present in the organic material, as well as the desired activated micro-organisms and enzymes. The concentration of the desired activated digesting agent in such activated sludge depends on the activation conditions, e.g., the incubation temperature and time, the incubation pH, the amount of nutrient factors and co-enzymes present, etc.

The concentration of undesired activated micro-organisms depends on the nature of the organic material, which can fluctuate widely within each day and from day to day. The undesired activated micro-organisms and enzymes may hinder the activity of the desired micro-organisms and enzymes.

DISCLOSURE OF INVENTION

It is an object of the invention to overcome the disadvantages of the prior art.

According to the invention there is provided an apparatus for activation of a digesting agent for an organic material, the apparatus comprising a tank; means for activating the digesting agent in the tank; and means for enabling the activated digesting agent to contact the organic material.

Preferably, the activating means is a heating element for thermally activating the digesting agent.

More preferably, the apparatus is additionally provided with a temperature control means for controlling actuation of the heating element, so that the digesting agent is thermally activated by incubation at a pre-determined temperature.

Advantageously, the apparatus is further provided with a container for housing a plurality of charges of the inactivated digesting agent, the container being in communication with the tank; and regulating means for introducing a charge of inactivated digesting agent from the container into the tank.

More advantageously, a liquid control means is provided for introducing a charge of a liquid into the tank; and the temperature control means operatively associated with the heating element enables the liquid to be heated to the pre-determined temperature prior to the introduction of the charge of the inactivated digesting agent into the tank.

Preferably, the apparatus is also provided with a first timer means which, when the liquid in the tank reaches the pre-determined temperature, actuates the regulating means for enabling the charge of inactivated digesting agent to be fed into the tank.

More preferably, the inactivated digesting agent is in liquid concentrated form when in the container and is in diluted form when in the tank. Alternatively, the inactivated digesting agent is in powder form when in the container and is in a dissolved or suspended form when in the tank.

BRIEF DESCRIPTION OF DRAWINGS

Two embodiments of the invention will now be described by way of example, with reference to the accompanying drawings, in which.

DESCRIPTION OF PREFERRED EMBODIMENTS

Figure 1:
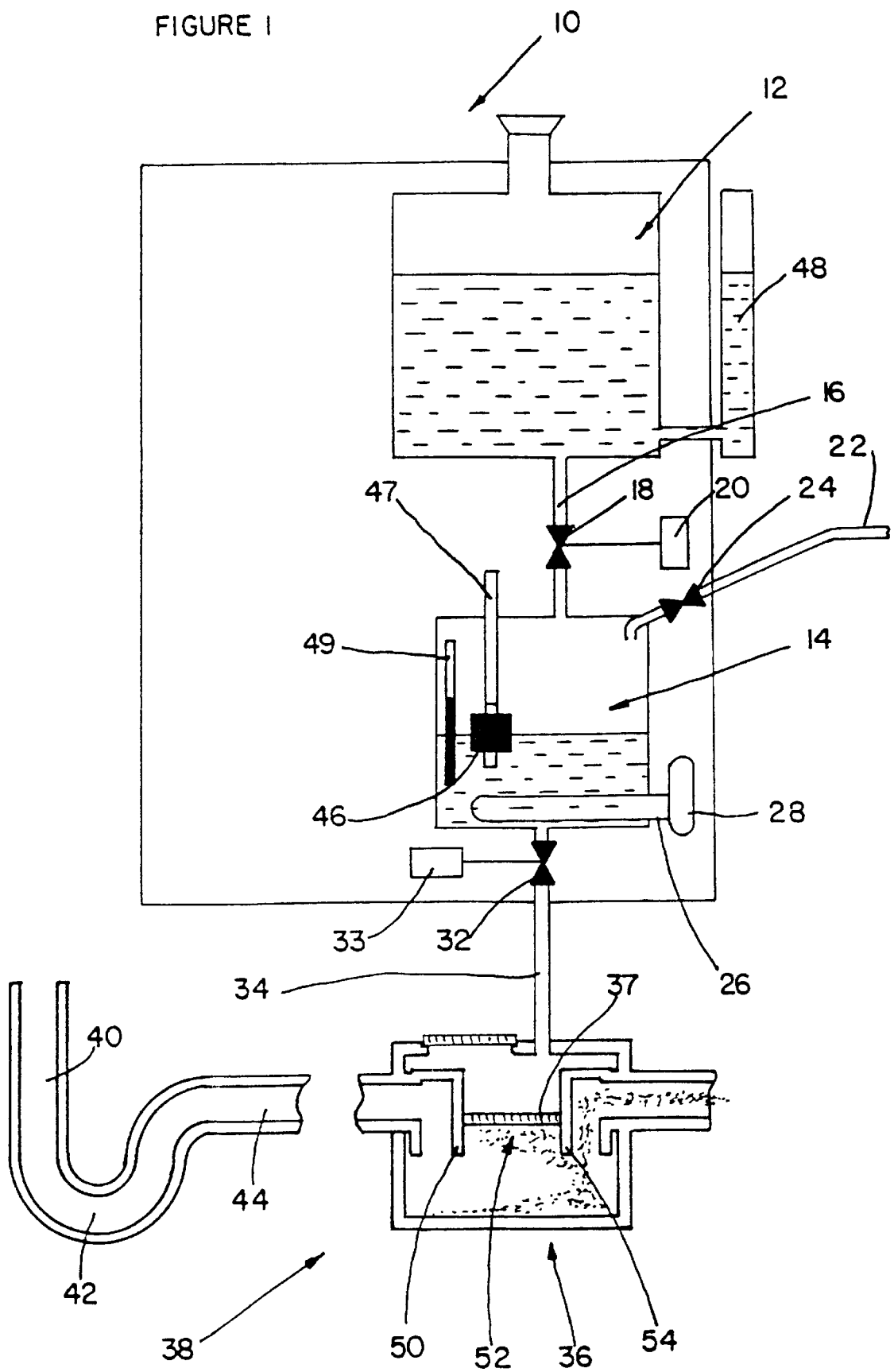
FIG. 1 is a schematic view of a first embodiment of an apparatus according to the invention.

Referring now to FIG. 1 of the accompanying drawings, there is illustrated a first embodiment of an apparatus 10 according to the invention comprising a five-fifteen liter container 12 and a two liter tank 14. The capacity of the container 12 is selected having regard to the anticipated usage of the apparatus 10 according to the invention. The digesting agent, e.g. "Super Chemzyme III" or "BIO-CAT WD10", is stored in the container 12 in liquid concentrated form. If the apparatus 10 is to be located outdoors, it may be necessary to fit an insulating jacket (not shown) around the container 12, to prevent freezing of the concentrated digesting agent in the container 12. The apparatus 10 is provided with a transparent level indicator 48 located on the outside of the apparatus 10, so that the level of concentrated digesting agent in the container 12 can be easily ascertained.

A pipe 16 enables the container 12 to be in liquid communication with the tank 14. A regulating means or valve 18, which is controlled by a first timer means or first timer 20 (as described hereinafter), is fitted on the pipe 16.

Liquid in the form of water or an aqueous solution containing, e.g., suitable nutrients is supplied via a pipe 22 into the tank 14. The pipe 22 is provided with an inlet valve 24. A magnetic float switch 46 on an adjustable slide rod 47 is operatively connected to the inlet valve 24. The magnetic float switch 46 is a magnetic sensing direct acting float switch, which maintains the pre-determined liquid level in the tank 14. The liquid level in the tank 14 can be adjusted by adjusting the position of the magnetic float switch 46 on the slide rod 47.

The tank 14 is provided with a heating element 26. A thermometer 49 is operatively connected to a thermal switch 28 which controls the heating elements 26. An exit pipe 34 provides liquid communication between the tank 14 and one or more grease trap(s) 36 of one or more drainage system(s) 38 (only one grease trap 36 of one drainage system 38 illustrated). An exit valve 32, which is controlled by a second timer means or second timer 33, is fitted on the exit pipe 34.

The drainage system 38 comprises a downpipe 40 communicating with a U-shaped trap 42, which in turn communicates with a substantially horizontal pipe 44 leading into the grease trap 36, downstream of which is either a septic tank (not shown) or a mains waste outlet (not shown). The grease trap 36 has a deflector 50 and a baffle 54, which partly define a central chamber 52.

Figure 2:
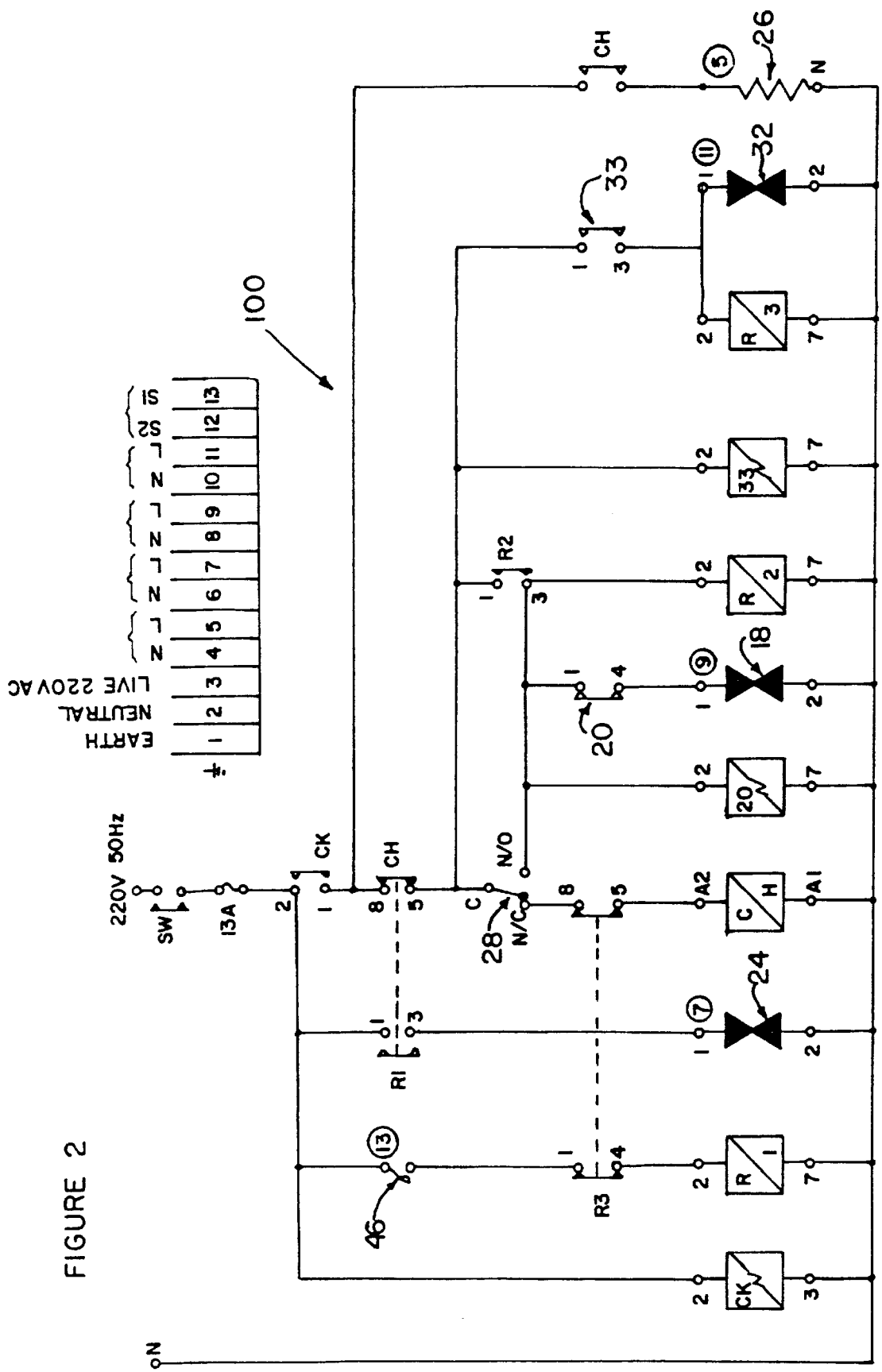
FIG. 2 is a circuit diagram for the apparatus of FIG. 1.

Referring now to FIG. 2 of the accompanying drawings, there is illustrated a circuit 100 for the first embodiment of the apparatus 10 according to the invention.

The circuit 100 includes a mains switch SW, a 13 amp fuse and a 24 hour clock timer CK. Closure of the contact CK initiates the cycle of events and opening of the contact CK, after a period of one hour has elapsed, resets the apparatus 10, ready for the next cycle.

A first relay R1 controls the operation of the inlet valve 24. A contractor heater CH and the termal switch 28 control the operation of the heating element 26. The first relay contact R1 is ganged to one of the contacts CH, to prevent actuation of the contactor heater CH while the magnetic float switch 46 and the first relay contact R1 are closed. The first time 20 controls the operation of the valve 18. A second relay R2 prevents retriggering of the first timer 20 by the thermal switch 28 (as explained hereinafter). The second timer 33 controls the opening of the exit valve 32 and, at the same time, actuates a third relay R3, which prevents both opening of the inlet valve 24 and actuation of the contactor heater CH when the exit valve 32 is open.

The digesting agent is thermally activated by the apparatus 10 according to the invention in the following manner, with particular reference to FIG. 2 of the accompanying drawings. When the magnetic float switch 46 closes, the first relay R1 causes the closure of the first relay contact R1, which in turn causes the inlet valve 24 to open. Closure of the first relay contact R1 causes the ganged contact CH to open. When the desired volume of 2,000 ml is reached, the magnetic float switch 46 opens, thereby causing the inlet valve 24 to be closed. Opening of the first relay contact R1 causes the closure of the ganged contact CH. At a preselected time, e.g., 2 a.m., the contact CK closes and the contactor heater CH activates the heating element 26 so as to heat the liquid in the tank 14 to the pre-determined incubation temperature, which is typically within the range 35°–43° C., preferably 37° C.±1° C. When the predetermined incubation temperature has been reached, the thermal switch 28 moves to the normally open position. The first timer 20 is then set or programmed to maintain the first timer contact 20 in the closed position, and therefore the valve 18 opened, for a period sufficient so as to release a pre-determined charge (e.g., 12 seconds to release approximately 40 ml) of the concentrated digesting agent from the container 12 into the tank 14 via the pipe 16. When the thermal switch 28 moves to the normally open position, the second relay R2 causes the second relay contact R2 to move to the closed position, thereby providing unbroken power to the first time 20. The second relay R2 thus prevents retriggering of the first timer 20 by the thermal switch 28, due to the sudden drop in temperature when the concentrated digesting agent is released into the pre-incubated liquid in the tank 14.

It is desirable to incubate the diluted digesting agent at 37° C.±1° C. for 30–60 minutes (preferably 40 minutes). The second timer 33 is set or programmed so that following a pre-determined incubation time period after actuation (by closure of the contact CK), the second timer contact 33 is closed, thereby causing the exit valve 32 to be opened. This permits release of the activated digesting agent from the tank 14 along the exit pipe 34, which feeds the activated digesting agent into the central chamber 52 of the grease trap 36. While the activated digesting agent is being released from the tank 14, the third relay R3 causes the third relay contact R3 to be opened, which in turn prevents actuation of the heating element 26 and also opening of the inlet valve 24 to prevent dilution of the activated digesting agent with water or nutrient solution being supplied via pipe 22. The contact CK then opens and the third relay contact R3 closes, thereby permitting the refilling of the tank 14 with 2,000 ml of liquid. When the contact CK closes at the pre-selected time (e.g., 2 a.m.) the next selected day, the cycle of operations described hereinabove is repeated.

The period of opening of the valve 18 can be varied by adjusting a dial on the first timer 20. The incubation period of the diluted digesting agent can be similarly varied by adjusting a dial on the second timer 33.

In the absence of liquid in the tank 14 or in the event of seepage or leakage from the tank 14 during the incubation period, the heating element 26 is automatically turned off, to limit damage to the heating element 26 and to reduce the risk of a potential fire hazard.

Incubation at 35°–37° C. for 35 minutes permits activation of the digesting agent—the microorganisms contained in the digesting agent have then passed through at least one, preferably two or three, reproductive cycle(s) and are multiplying at a faster rate than the dormant microorganisms contained in the unactivated digesting agent.

The apparatus 10 may be provided with a mixer (not shown) located in the tank 14.

Figure 3:
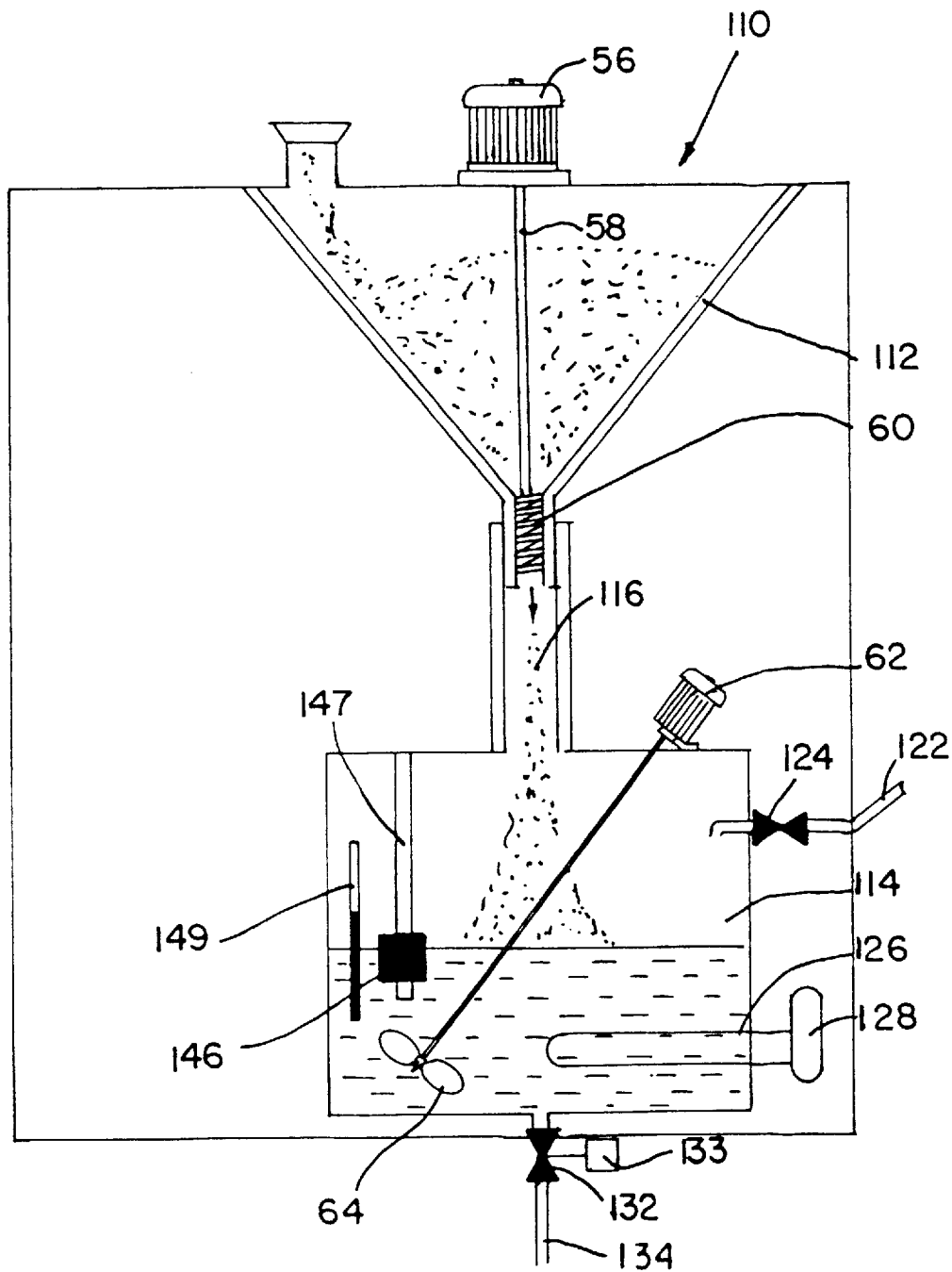
FIG. 3 is a schematic view of a second embodiment of an apparatus according to the invention.

Referring now to FIG. 3 of the accompanying drawings, there is illustrated a second embodiment of an apparatus 110 according to the invention comprising a container 112 and a tank 114. The capacity of the container 112 is selected having regard to the anticipated usage of the apparatus 100.

The digesting agent is stored in the container 112 in powder form. The container 112 may be provided with a desiccant (not shown).

A pipe 116 enables the container 112 to be in communication with the tank 114. A regulating means or auger 60 is located in the mouth of the pipe 116. A motor 56 is operatively connected to a drive rod 58 which in turn is connected to the auger 60. A first timer means for first timer (not shown) controls actuation of the motor 56.

Liquid in the form of water or an aqueous solution containing suitable nutrients is supplied by a pipe 122 into the tank 114. The pipe 122 is provided with an inlet valve 124. A magnetic float switch 146 on an adjustable slide rod 147 is operatively connected to the inlet valve 124.

The tank 114 is provided with a heating element 126. The tank 114 is also provided with a stirrer motor 62 operatively connected to a stirrer 64. A thermometer 149 is operatively connected to a thermal switch 128 which controls the heating element 126. An exit pipe 134 provides liquid communication between the tank 114 and one or more grease trap(s) of one or more drainage system(s) (not shown). An exit valve 132, which is controlled by a second timer means or second timer 133, is fitted on the exit pipe 134.

The digesting agent is thermally activated by the apparatus 110 according to the invention in the following manner. When the magnetic float switch 146 closes, the inlet valve 124 is caused to open. When the desired volume of liquid in the tank 114 is reached, the magnetic float switch 146 opens, and the inlet valve 124 closes. At a pre-selected time, the heating element 126 is actuated so as to heat the liquid in the tank 114 to the pre-determined incubation temperature, which is typically within the range of 35°–43° C., preferably 37° C.±1° C. When the pre-determined incubation temperature has been reached, the first timer actuates the motor 56/drive rod 58/auger 60 for a number of revolutions sufficient so as to release a pre-determined charge of the digesting agent from the container 112 into the tank 114 via the pipe 116. For example, two hundred revolutions of the auger 60 would release 50 g of the digesting agent into the tank 114. The stirrer motor 62 is then actuated and the stirrer 64 ensures that the powdered digesting agent is mixed with the water or aqueous solution contained in the tank 114. When the digesting agent has been incubated in the water or aqueous solution at 37° C.±1° C. for 30–60 minutes (preferably 40 minutes), the second timer 133 actuates the opening of the exit valve 132. This permits the release of the activated digesting agent from the tank 114 along the exit pipe 134, so as to enable the activated digesting agent to contact the organic material for bio-degradation. While the activated digesting agent is being released from the tank 114, the inlet valve 124 remains closed and the heating element 126 cannot be actuated. When the contents of the tank 114 have been released, the exit valve 132 closes and the inlet valve 124 opens, thereby permitting refilling of the tank 114 with the desired volume of liquid. At the pre-selected time on the next selected day, the cycle of operations described hereinabove is repeated.

The number of revolutions of the auger 60 can be varied by adjusting a dial on the motor 46.

It will be appreciated that the apparatus 10 or 110 according to the invention may, alternatively, be controlled by a programmable logic controller.

It will also be appreciated that the activated digesting agent can be released from the apparatus according to the invention into any location of the drainage system, for example, the horizontal pipe, although experiments have indicated that release of the activated digesting agent onto a grease layer in the grease trap is preferable.

It will further be appreciated that a charge of the concentrated digesting agent may be fed into the tank of the apparatus according to the invention either manually or, alternatively, automatically from either a container housed in the apparatus or from bulk storage external of the apparatus using a lift-metering pump, e.g., a peristaltic pump.

The amount of activated digesting agent to be used will depend on the flow rate through, and capacity of, the grease trap and on the frequency of treatment. Activated digesting agent may be released into the drainage system at daily intervals or twice weekly. If daily treatment is adopted, lower amounts of activated digesting agent are required for each treatment.

The apparatus according to the invention permits effective preventative maintenance of drainage systems by allowing automated release of the activated digesting agent to contact the organic material.

We claim:

1. An apparatus for the bio-degradation of an organic material selected from the group consisting of human and other animal excrement, and domestic and industrial waste, the apparatus comprising:
    a first container for accommodating a liquid concentrate of an unactivated digesting agent;
    a second container;
    a communication means for the passage of the liquid concentrate from the first container to the second container;
    a first regulating means operatively associated with the communication means and actuatable to pass the liquid concentrate through the communication means from the first container to the second container;
    an inlet means for the passage of an aqueous liquid into the second container, the aqueous liquid containing none of the organic material to be biodegraded;
    a second regulating means operatively associated with the inlet means and actuatable to pass the aqueous liquid through the inlet means to the second container;
    means for activating unactivated digesting agent in the second container, in the presence of the aqueous liquid but in the absence of the organic material to be biodegraded, so as to form an activated digesting agent in the second container;
    an outlet means for the passage of activated digesting agent from the second container to the organic material;
    a third regulating means operatively associated with the outlet means and actuatable to pass the activated digesting agent through the outlet means from the second container to the organic material; and
    automatic timing means for cyclically controlling the actuation of the first, second and third regulating means such that, in each cycle the following steps are performed:

(a) the second regulating means is actuated to fill the second container with the aqueous liquid to a predetermined level and is then de-actuated, the first and third regulating means being de-actuated while the second regulating means is actuated;

(b) the first regulating means is actuated to permit a predetermined volume of the liquid concentrate to flow from the first container into the second container and is then de-actuated, the second and third regulating means being de-actuated while the first regulating means is actuated;

(c) the first, second and third regulating means are all maintained de-actuated for a period of time sufficient to permit the activating means to activate the unactivated digesting agent; and (d) the third regulating means is actuated to permit the activated digesting agent to flow from the second container into contact with the organic material to be bio-degraded and is then de-actuated, the first and second regulating means being de-actuated while the third regulating means is actuated;

whereby, in use, the activated digesting agent is supplied to the organic material intermittently as determined by the actuation of the third regulating means.

2. An apparatus according to claim 1, wherein at least one of the first, second and third regulating means is a valve.

3. An apparatus according to claim 1, in which the activating means is a heating element, the apparatus further including a temperature control means for controlling actuation of the heating element, so that the unactivated digesting agent is thermally activated by incubation in the tank at a pre-determined temperature during step (c) of the cycle.

4. An apparatus according to claim 3, wherein the temperature control means provides that the liquid concentrate is heated to the pre-determined temperature prior to step (b) of the cycle.

5. An assembly comprising an apparatus according to claim 1 and a system for housing the organic material to be bio-degraded, in which the outlet means is an exit pipe in fluid communication between the second container and a system for housing the organic material to be bio-degraded.

6. An assembly according to claim 5 in which the housing system is selected from the group consisting of a drainage system, a waste water system and a sewage system.

7. An assembly according to claim 6, in which the housing system comprises a grease trap.

8. A method of improving bio-degradation of an organic material selected from the group consisting of human and other animal excrement, and domestic and industrial waste, the method comprising contacting the organic material with an activated digesting agent formed using an apparatus according to claim 1.

* * * * *